United States Patent [19]

Klein

[11] Patent Number: 4,858,516
[45] Date of Patent: Aug. 22, 1989

[54] BRAKE CYLINDER-PISTON SLAVE UNIT SEAL HAVING RADIAL ROLL-BACK PROTRUSION FOR PISTON SPRING BACK RETRACT

[75] Inventor: Hans-Christof Klein, Hattersheim, Fed. Rep. of Germany

[73] Assignee: Alfred Teves GmbH, Frankfurt, Fed. Rep. of Germany

[21] Appl. No.: 623,836

[22] Filed: Jun. 22, 1984

[30] Foreign Application Priority Data

Jun. 29, 1983 [DE] Fed. Rep. of Germany ....... 3323361
Feb. 13, 1984 [DE] Fed. Rep. of Germany ....... 3405028

[51] Int. Cl.$^4$ ...................... F16D 65/20; F16D 65/24; F16J 15/32; F16J 15/34
[52] U.S. Cl. .......................................... 92/240; 92/248; 92/254; 277/27; 277/166; 277/205; 277/207 R; 188/72.4; 188/370
[58] Field of Search .................. 92/212, 222, 240, 242, 92/248, 105

[56] References Cited

U.S. PATENT DOCUMENTS

| | | | |
|---|---|---|---|
| 2,050,736 | 8/1936 | Sampson | 92/105 |
| 2,089,471 | 8/1937 | Geyer | 92/105 |
| 2,132,730 | 10/1938 | Geyer | 92/105 |
| 2,926,976 | 3/1960 | Bowerman | 92/240 |
| 3,144,256 | 8/1964 | Wright | 92/242 |
| 3,971,217 | 7/1976 | Firth | 92/105 |
| 4,170,926 | 10/1979 | Emmett | 92/212 |
| 4,364,159 | 12/1982 | Holcombe | 92/222 |
| 4,417,503 | 11/1983 | Izumi | 92/240 |
| 4,498,219 | 2/1985 | Ban | 92/212 |
| 4,510,752 | 4/1985 | Gaiser | 92/222 |

FOREIGN PATENT DOCUMENTS

| | | | |
|---|---|---|---|
| 2923934 | 12/1979 | Fed. Rep. of Germany | 92/222 |
| 1462580 | 12/1965 | France | 92/248 |

Primary Examiner—Robert E. Garrett
Assistant Examiner—George Kapsalas
Attorney, Agent, or Firm—Robert P. Seitter

[57] ABSTRACT

In a piston-cylinder assembly for hydraulic brake systems of automotive vehicles, the piston is at least partially composed of ceramics. A hydraulic seal is interposed between the piston and the cylinder. To simplify the assembly while allowing comparatively great tolerances, the seal is fitted at the end of the piston that is adapted to be mounted close to a pressure chamber within the system. The seal is provided with radially-extending projections which cause the piston to spring back by a roll-back effect.

23 Claims, 4 Drawing Sheets

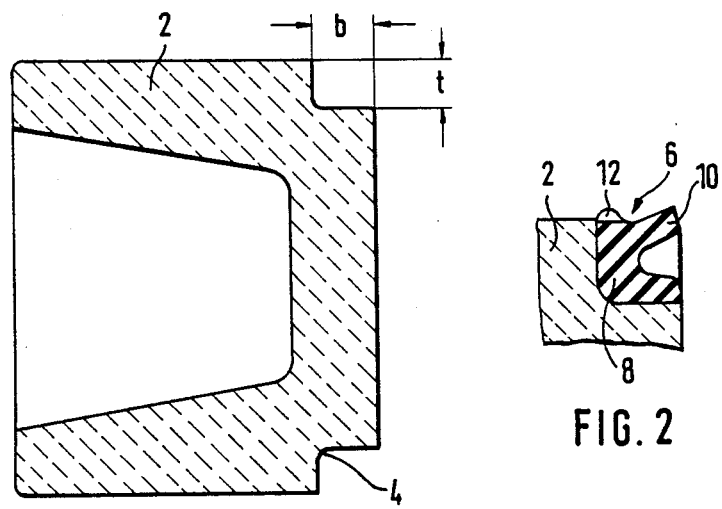
FIG. 1
FIG. 2
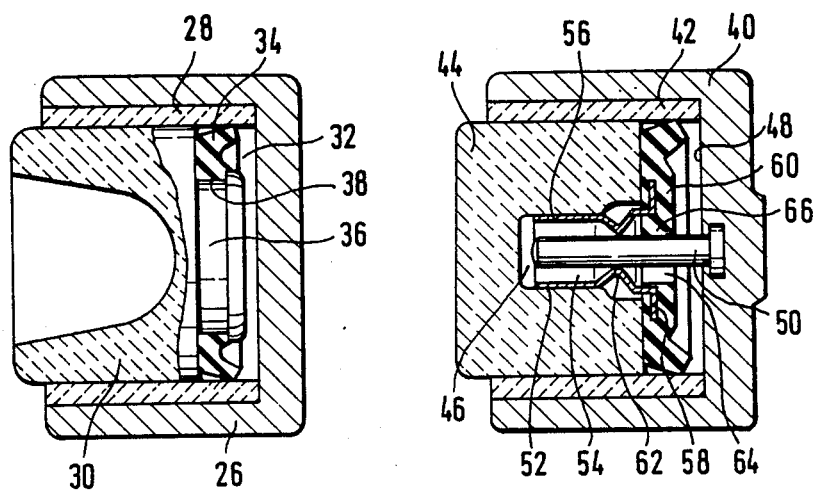
FIG. 6
FIG. 7

BRAKE CYLINDER-PISTON SLAVE UNIT SEAL HAVING RADIAL ROLL-BACK PROTRUSION FOR PISTON SPRING BACK RETRACT

BACKGROUND OF THE INVENTION

The present invention relates to a piston-cylinder assembly for brakes. Ceramic pistons for the actuation of brakes are known as used on wheel brake cylinders. German printed and published patent application DE-OS 16 55 344, for instance, discloses an arrangement of one known type. In this known arrangement, the piston for the wheel brake cylinder is made entirely from any ceramic material, e.g. magnesium silicate or aluminium oxide. Arranged in front of the piston in the pressure chamber is a primary seal and a filler consisting of plastics. A piston comprising a ceramic pressure member is known from German printed and published patent application DE-OS 31 48 873.

Principally, such ceramic pistons afford a great number of advantages, such as low-cost manufacture; configuration in a number of minor shape variations, dimensional stability even at higher temperatures resulting no change in the clearance between piston and cylinder bore; poor heat conduction as a result of which the hydraulic system is protected against becoming overheated; resistance to compression, corrosion resistance as a result of which jamming of the pistons due to corrosion is prevented; noise-damping effect and low weight.

However, sealing problems occur with the known arrangements, in particular upon the occurrence of major dimensional discrepancies in the manufacture of the ceramic components.

SUMMARY OF THE INVENTION

It is therefore an object of the present invention to provide a piston-cylinder assembly of the type described generally, which precludes sealing problems and which can compensate for major maufacturing tolerances.

Using the present inventive concept, a piston-cylinder assembly for brakes is provided which can be manufactured at low cost, and which can bridge major dimensional discrepancies that may occur during manufacture. Furthermore, this assembly eliminates the need to arrange for a dust boot between housing and piston, since corrosion will not appear due to the ceramic material of the piston.

In a favorable embodiment of this invention, the piston is furnished at its end with an annular notch into which a seal is inserted. Suitably, this notch is radially and/or axially open.

In another advantageous embodiment of this invention, the seal is prevulcanized to the piston. Expediently, the seal is basically a lip seal which comprises an essentially L-shaped main body, from which a sealing lip extends inclinedly axially/radially outwardly.

To attain a roll-back effect, radial projections are arranged at the main body of the seal spread over its periphery. These projections produce a clamping effect between ring seal and cylinder wall and are dimensioned such that the piston will spring back after a specific axial operation due to hydraulic pressure (roll-back effect).

In another embodiment of this invention, the piston is furnished with a central attachment, to which the seal is fitted with a positive engagement.

A ceramic bushing accommodated in the cylinder may cooperate with the piston which, advantageously, is entirely made of ceramics.

According to another inventive solution, the ring seal comprises a prop ring which bridges tolerances in the piston and cylinder. This solution produces a piston-cylinder assembly which can be manufactured at very low costs and nevertheless meets all requirements. This construction ensures good bridging of tolerances and good guidance at low static friction. The prop ring can be inserted with small clearance. Escape of the sealing material is reliably precluded.

In one advantageous embodiment of this invention, the prop ring is arranged substantially within the seal body. Expediently, the prop ring is located on a step or in a groove of the piston, respectively, while it abuts in particular with one of its radially extending end faces and a radially extending groove wall or step wall. To constitute a unit, the prop ring is vulcanized into the seal body.

Another advantageous embodiment provides that, along at least part of the length of the piston's periphery, elastic centering webs are secured which are preferably connected to the seal body. Suitably, this design may furnish the prop ring with through-recesses via which the centering webs are coupled to the seal body. It is expedient in this respect to arrange the recesses at the outer rim of the prop ring.

According to still another inventive solution, there is no provision of a prop ring; in this event, elastic intermediate webs are fastend along of at least part of the length of the piston's periphery and are coupled to the seal body in particular.

BRIEF DESCRIPTION OF THE DRAWINGS

Embodiments of the present invention and their advantages will be described in more detail hereinbelow with reference to the accompanying drawings in which:

FIG. 1 is a longitudinal cross-section taken through a ceramic piston containing at its bottom a circumferential notch;

FIG. 2 is a longitudinal cross-section (in partial view only) taken through the ceramic piston of FIG. 1 with a ring seal secured to said's notch;

FIG. 6 shows another embodiment of a ceramic piston-cylinder assembly in section, the assembly comprising a ceramic piston with ring seal, the ceramic piston being inserted in a ceramic bushing;

FIG. 7 shows in cross-section a third embodiment of a ceramic piston-cylinder assembly;

DETAILED DESCRIPTION OF THE PREFERRED EMBODIMENTS

Figure 3:
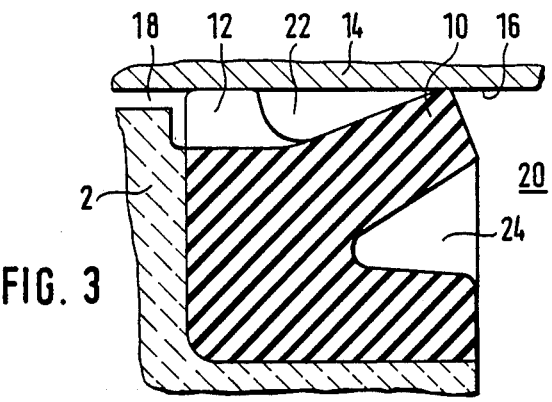
FIG. 3 is an enlarged view in section of the assembly shown in FIG. 2 when mounted into a cylinder and in the non-actuated initial position.

FIGS. 1 and 2 show a longitudinal cross-sectional view of a hollow ceramic piston 2, FIG. 2 displaying only part of the rear end of the piston that is close to the pressure chamber in the mounted condition. At its rear end the piston 2 contains a circumferential notch 4 whose radial depth is designated "t" and whose axial length is designated "b". This notch is shown herein as being radially and axially open to the rear. It can, however, also have the configuration of a radially and axially open groove (not illustrated). In FIG. 2, the hollow ceramic piston 2 is illustrated with a ring seal 6 inserted into the notch. The ring seal 6 has the design of a circular lip seal which is connected to the ceramic piston 2 by prevulcanization. The ring seal 6 shown in cross-section in FIG. 2 comprises an L-shaped main body 8 whose outer surfaces are coupled to the corresponding surfaces of the notch 4 by prevulcanization. Extending from the L-shaped main body 8, a sealing lip 10 is constituted which extends radially/axially inclinedly outwardly, the sealing lip having a substantially rectangular configuration in cross-section. At the end of the radially outwardly directed leg of the L-shaped main body 8, a series of spaced elevations or projections 12, respectively, are spread over the periphery of the ring seal which cause a roll-back effect that will be described thereinbelow relative to FIGS. 3 through 5. The outer diameters of the sealing lip 10 and of the projections 12 bringing about the roll-back effect are chosen such as to bridge the tolerances of the piston diameter and of the cylinder bore $D_B$.

Figure 4:
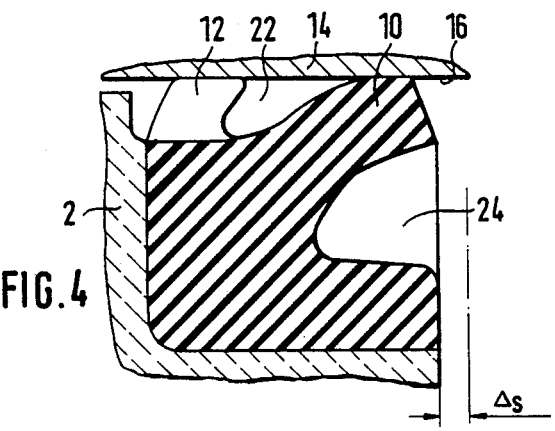
FIG. 4 shows in section the assembly of FIG. 3 shifted under pressure by a distance s to the left.
Figure 5:
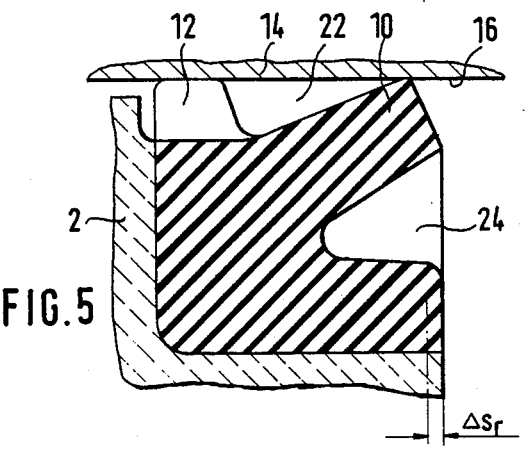
FIG. 5 shows in section the assembly of FIGS. 3 and 4 after pressure relief shifted back by a distance $\Delta s_r$ due to the roll-back effect.

In FIGS. 3 through 5, the ceramic piston 2 is illustrated in the state of being mounted into the bore of a cylinder 14, the cylinder 14 being indicated in the cross-sectional illlustration merely by its wall 16 disposed on top. In the unpressurized condition illustrated in FIG. 3, the gap 18 between the body of the ceramic piston 2 and the cylinder 14, which gap is formed for example by tolerances, will be bridged by the sealing lip 10 and the projections 12. To this end, the sealing lip 10 abuts against the cylinder wall 16 in the front edge portion, while the projections 12 abut against the cylinder wall 16 essentially with their entire axially extending surface. When pressure develops in the pressure chamber 20, the piston 2 will be moved to the left by the amount of travel distance s, while both the sealing lip 10 and the projections 12 deform. In doing so, the projections 12 will be deflected to the right in opposition to the direction of motion of the piston, while the sealing lip 10 is urged by the developed pressure in the direction of the wall 16 of the cylinder 14, as a result of which the area of abutment on the cylinder wall 16 will be increased. To enable movement of the sealing lip 10 and of the projections 12, there are formed recesses 22 and 24 having substantially U-shaped cross-section. FIG. 5 shows the piston in the unpressurized state, the piston having moved back by a partial amount $\Delta s_r$ of the travel $\Delta s$ (to the right when viewing in the drawing) due to the roll-back effect of the projections 12.

FIG. 6 illustrates another embodiment of the inventive piston-cylinder assembly. In this case, a bushing 28 made of ceramics is immovably arranged in the cylinder 26. Within the bushing 28, a ceramic piston 30 is arranged for axial movement. Piston 30 carries a ring seal 34 at its end close to the pressure chamber 32. To fasten the ring seal 34, the piston 30 comprises a central extension 36 in which a circumferential annular groove 38 is recessed. Inserted in this annular groove 38 is the radially inner end of ring seal 34. In this illustration, the ring seal 34 does not comprise any roll-back projections; however, these may be easily arranged for also in this design.

FIG. 7 shows another embodiment in which there is shown a cylinder 40 with ceramic bushing 42 which incorporates a piston 44. Piston 44 contains a central cavity 46 into which projects a central pin 50 which is secured to the bottom 48 of the cylinder, a gap 54 remaining between pin 50 and the wall 52 confining the cavity 46. This gap 54 contains a slotted sheet-metal element 56 which is of substantially cylindrical shape and which has at its one end an outwardly extending flange 58 which is seated in a lip seal 60 and thus connects the sheet-metal element 56 to the lip seal 60. The sheet-metal element 56 comprises an inward circumferential projection 62, V-shaped in cross-section, by which it is in contact with the pin 50. The lip seal 60 contains a central through-bore 64 through which the pin 50 extends. In the through-bore 64, at least one projection 66 is arranged by which the lip seal 60 bears against the pin 50 and which causes the roll-back effect.

The piston assembly embodiment illustrated in FIGS. 8 through 10 will now be described. At its rear end that is close to the pressure chamber in the mounted condition, the piston 2 of FIG. 8 contains a circumferential notch or step 4, which is radially and axially open to the rear. A ring seal 6 is arranged in the notch 4. The ring seal 6 has the design of a circular lip seal which is connected to the ceramic piston by prevulcanization. The seal 6 has an L-shaped main body 8 whose inner surface 19 is coupled to the corresponding surface of the notch 4 by prevulcanization. Starting from the L-shaped main body 8, a sealing lip 10 is constituted which extends radially/axially inclinedly outwardly, the sealing lip having a substantially rectangular configuration in cross-section. At the end of the radially outwardly directed leg of the L-shaped main body 8, elevations or projections 12, respectively, are spread over the periphery of the ring seal which cause a roll-back effect. The outer diameters of the sealing lip 10 and of the projections 12 that bring about the roll-back effect are chosen such as to bridge tolerances of the piston diameter and of the bore receiving the piston.

Figure 8:
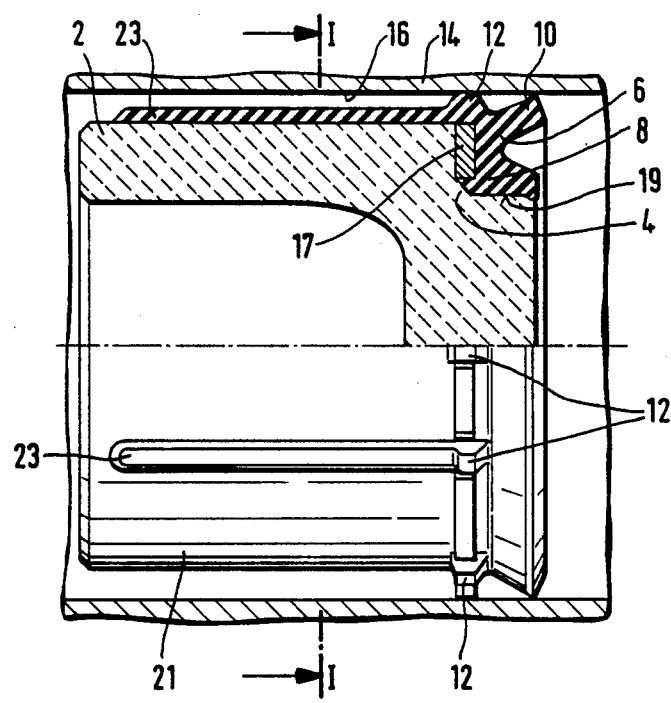
FIG. 8 shows a fourth embodiment of a ceramic piston-cylinder assembly with seal which is illustrated as a cross-section in the upper part of the figure.

In FIG. 8, the ceramic piston 2 is illustrated in its state fitted into a cylnder 14, the cylinder 14 being indicated in the cross-sectional view only by its wall 16 disposed both on the top and on the bottom.

Arranged inside the ring seal 6 is a prop ring 17 (FIG. 10) which bridges tolerances. The prop ring 17 is located essentially within the seal body and abuts with its radially extending end face, that is close to the open end of the piston, on the radially extending wall of the notch 4.

Spread over the piston's periphery 21 are three centering webs 23 (FIG. 9) which may be formed of any elastic material and which extend substantially paraxially alongside of at least part of the length of the piston's periphery. The centering webs 23 are expediently made from the same material as the ring seal 6 and are coupled to the latter. In the embodiment illustrated in FIGS. 8 and 9, by furnishing the prop ring 17 at its outer periphery with recesses 25, the centering webs 23 may be connected to the ring seal 6.

For manufacturing the piston-cylinder assembly, the prop ring 17 will be slid onto the step 4 (FIG. 8); the assembly will then be inserted into the vulcanizing mold in which the vulcanizing process takes place. By virtue of the vulcanizing process, the prop ring 17 is embedded in the ring seal 6, and the unit combined by ring seal 6, prop ring 17 and centering webs 23 will be coupled to the piston 2.

Figure 9:
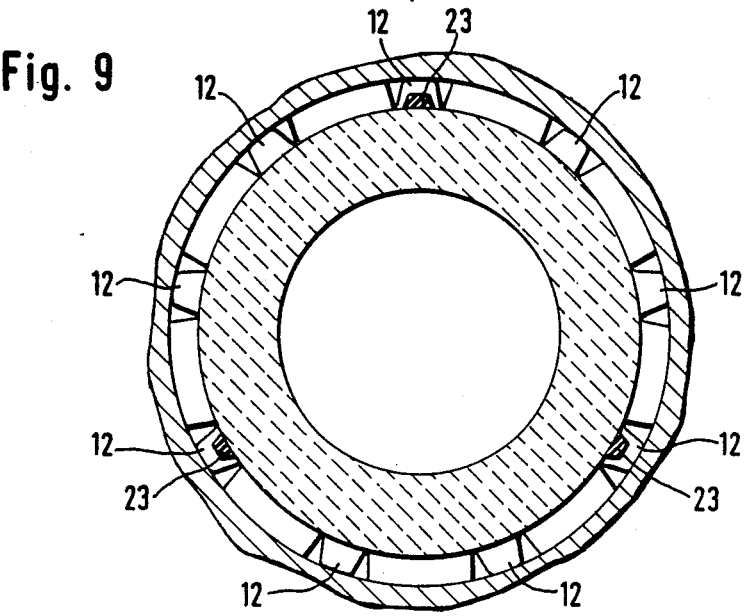
FIG. 9 shows a cross-section taken through the piston of FIG. 8 along the line I—I.
Figure 10:
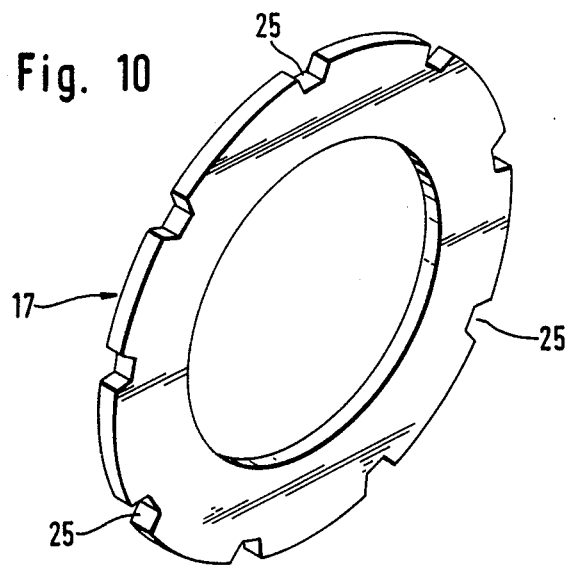
FIG. 10 shows in perspective a prop ring.
Figure 11:
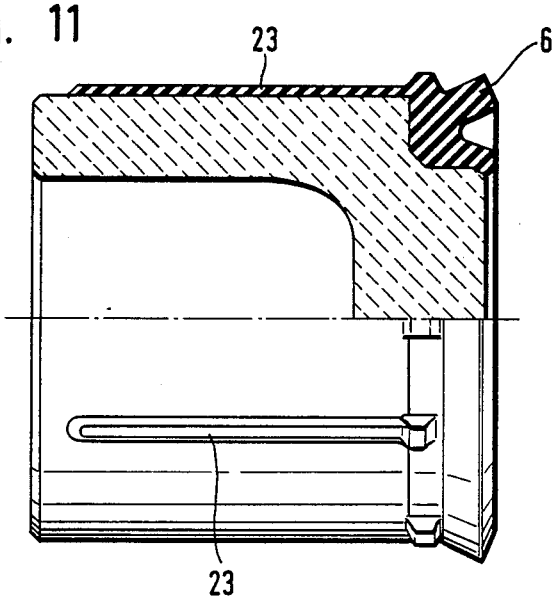
FIG. 11 shows a fifth embodiment of a ceramic piston, the upper half of which is shown in section.

The piston illustrated in FIG. 11 corresponds essentially to the one shown in FIGS. 8 and 9. In contrast to the assembly illustrated in FIGS. 8 and 9, a prop ring 17 is not provided in the piston shown in FIG. 11

What is claimed is:

1. A piston-cylinder assembly for a wheel brake unit of a hydraulic brake system of an automotive vehicle comprising:
    a ceramic piston received in a cylinder of said wheel brake unit with radial clearance between said cylinder and said piston, said piston movable between a brake released position and a braked position in response to hydraulic pressure on said piston;
    a seal on said piston at an end thereof exposed to said hydraulic pressure in said cylinder including a sealing lip extending at an acute angle outwardly from said piston into sliding sealing engagement with said cylinder, said seal further including roll-back means engaging said cylinder for substantially returning said piston to said brake released position upon reduction of said hydraulic pressure.

2. A piston-cylinder assembly as claimed in claim 1, in which the seal is prevulcanized to the piston.

3. A piston-cylinder assembly as claimed in claim 1, in which the piston comprises a central extension to which the seal is secured in positive engagement therewith.

4. A piston-cylinder assembly as claimed in claim 1, in which the cylinder contains a ceramic bushing.

5. A piston-cylinder assembly as claimed in claim 1, in which the piston includes at said end thereof an annular notch into which the seal is inserted.

6. A piston-cylinder assembly as claimed in claim 5, in which the notch is radially and axially open.

7. The piston-cylinder assembly as claimed in claim 1, wherein said roll-back means includes a plurality of resilient projections extending radially outwardly from said seal and being compressively engaged to said cylinder substantially against sliding movement relative thereto, whereby said projections axially deflect upon movement of said piston from said brake release position toward said braked position and resiliently return said piston substantially to the brake released position upon reduction of said hydraulic pressure.

8. The piston-cylinder assembly as claimed in claim 7, wherein said projections are axially spaced from said sealing lip defining an annual recess between said sealing lip and said projections, whereby said sealing lip is deflected into said recess by said hydraulic pressure.

9. A piston-cylinder assembly according to claim 1, wherein said seal is a hydraulic seal provided between the piston and the cylinder, the seal being fitted to the end of the piston that is adapted to be mounted close to a pressure chamber, in which there are a plurality of elastic centering webs fastened alongside of at least part of the length of the periphery of the piston to align the piston in the cylinder.

10. A piston-cylinder as claimed in claim 9, in which the centering webs are coupled to the hydraulic seal, the hydraulic seal comprising a ring seal.

11. A piston-cylinder assembly as claimed in claim 1, in which the cylinder comprises a central pin projecting into a cavity in the piston, and in that the seal abuts against the pin with at least one projection causing a roll-back effect.

12. A piston-cylinder assembly as claimed in claim 11, in which the projection is provided in a central through-bore of the ring seal.

13. A piston-cylinder assembly as claimed in claim 11, in which the seal is secured to the piston by means of an essentially cylinder-shaped, slotted sleeve portion which extends into the cavity.

14. A piston-cylinder assembly as claimed in claim 13, in which the sleeve portion comprises a sheet-metal element having an inwardly extending projection supported on the pin.

15. A piston-cylinder assembly according to claim 1, wherein said seal is a hydraulic seal provided between piston and cylinder, and in which the hydraulic seal comprises a ring seal including a prop ring which bridges tolerances in the cylinder diameter.

16. A piston-cylinder assembly as claimed in claim 15, in which the prop ring is located essentially within the main body of the ring seal.

17. A piston-cylinder assembly as claimed in claim 15, in which the prop ring is arranged on a step or in a groove of the piston respectively.

18. A piston-cylinder assembly as claimed in claim 17, in which the prop ring abuts with one of its radially extending end faces on a radially extending wall of the groove.

19. A piston-cylinder assembly as claimed in claim 15, in which the prop ring is vulcanized into the ring seal.

20. A piston-cylinder assembly as claimed in claim 15, in which there are elastic centering webs fastened alongside of at least part of the length of the periphery of the piston.

21. A piston-cylinder assembly as claimed in claim 20, in which the elastic centering webs are coupled to the ring seal.

22. A piston-cylinder assembly as claimed in claim 21, in which the prop ring contains through-recesses via which the centering webs are connected to the ring seal.

23. A piston-cylinder assembly as claimed in claim 21, in which the recesses are disposed at the outer rim of the prop ring.

* * * * *